Oct. 31, 1944.           H. MOSCHEL ET AL           2,361,489
                              HAY LOADER
                         Filed July 14, 1941         2 Sheets-Sheet 1
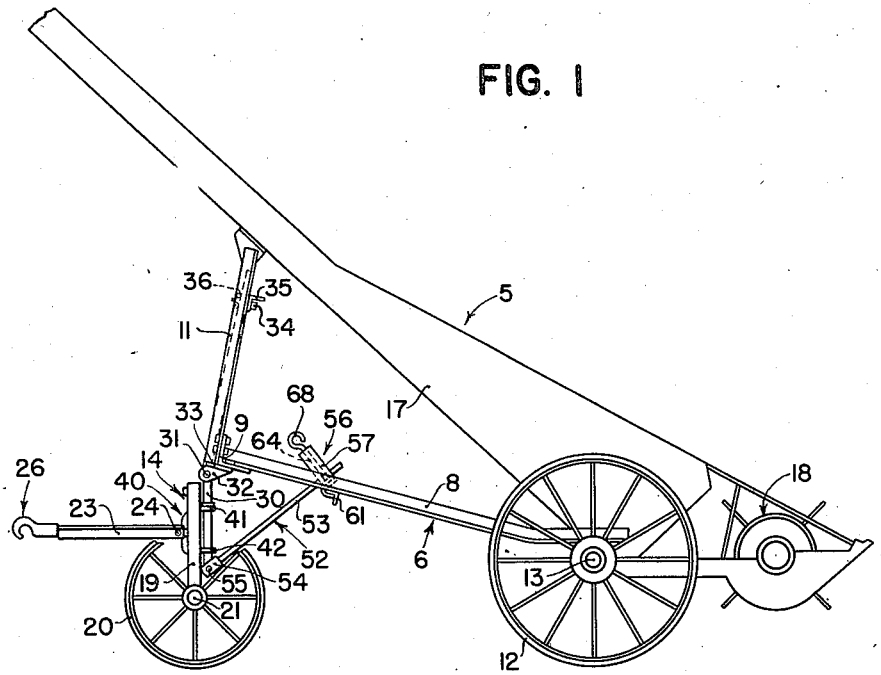
FIG. 1
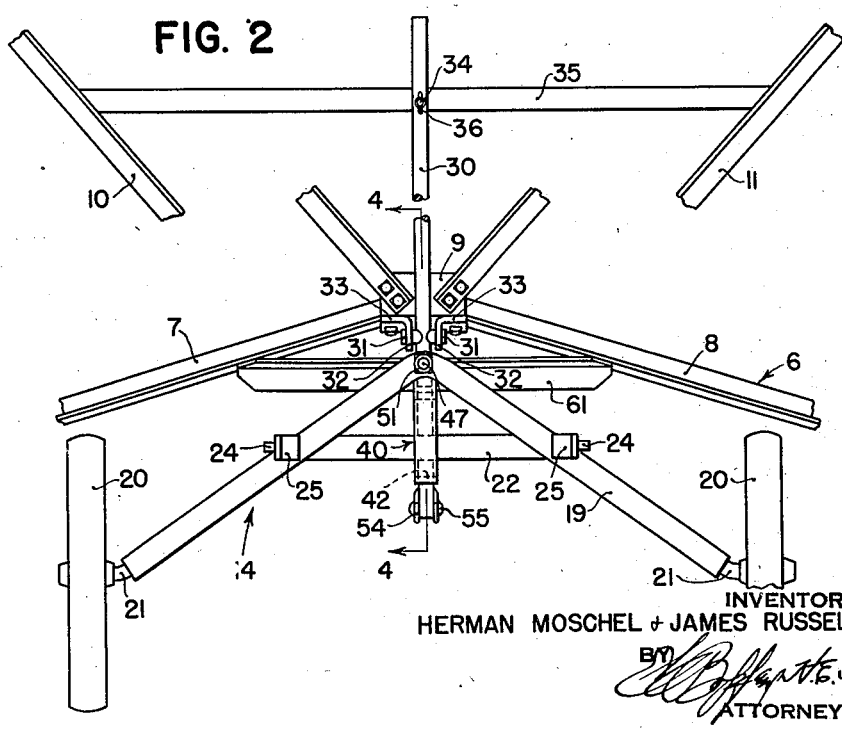
FIG. 2
INVENTORS
HERMAN MOSCHEL & JAMES RUSSELL DAY
ATTORNEYS

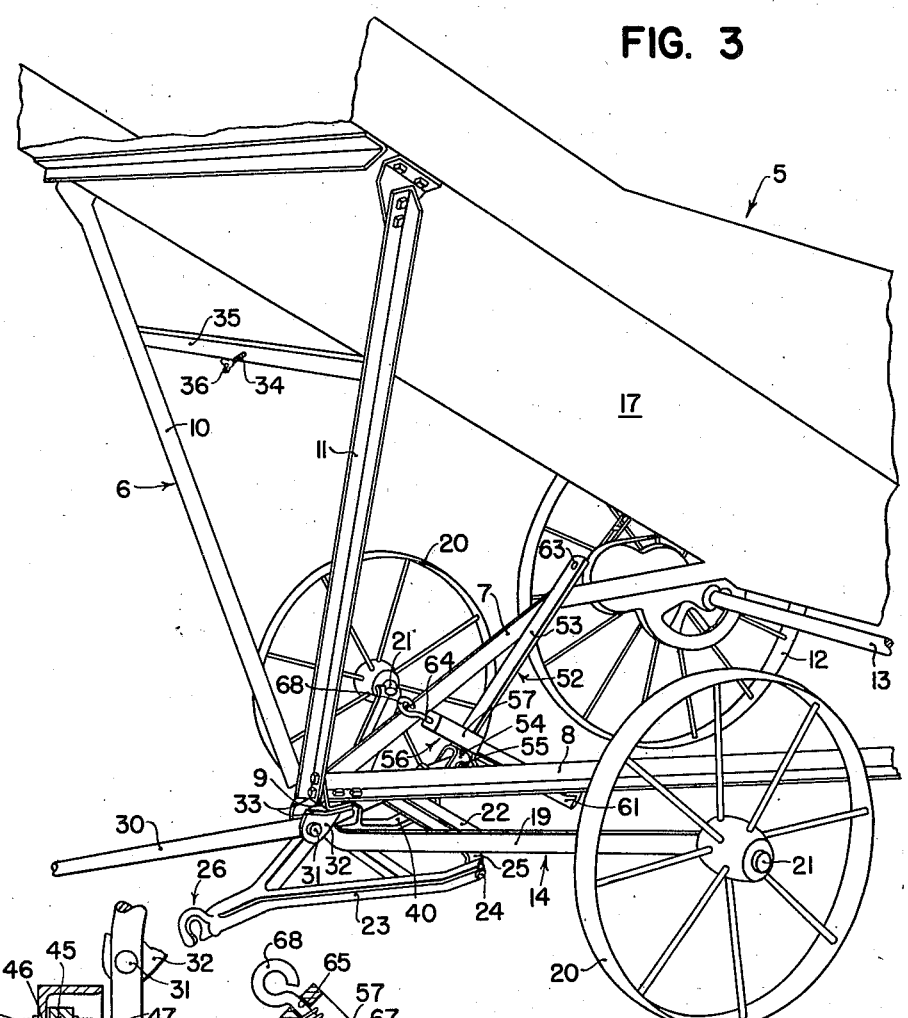
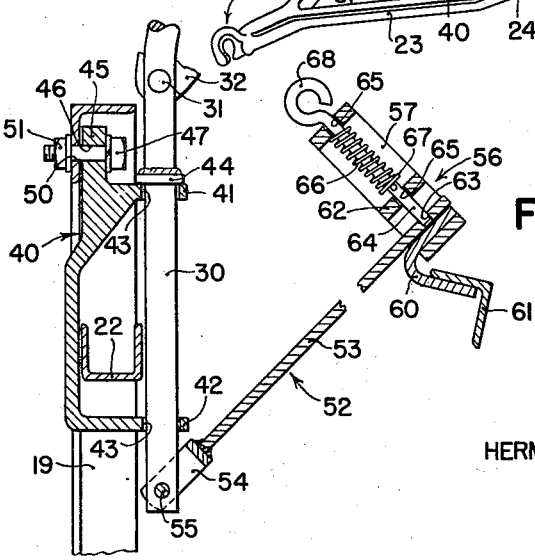

Patented Oct. 31, 1944

2,361,489

UNITED STATES PATENT OFFICE 2,361,489

HAY LOADER

Herman Moschel and James Russell Day, Ottumwa, Iowa, assignors to Dain Manufacturing Co. of Iowa, Ottumwa, Iowa, a corporation of Iowa Application July 14, 1941, Serial No. 402,370

16 Claims. (Cl. 198—233)

The present invention relates to hay loaders, such as are adapted to be hitched to the rear end of a hay rack for loading hay thereon, and pertains specifically to the type of loader comprising a forwardly and upwardly inclined deck which is supported at the rear end on a pair of main drive wheels and at the front end on a tongue truck. In implements of this kind it is often desirable to be able to lower the deck to allow the implement to be stored in a low-ceilinged shed, or to reduce the possibility of its being blown over by the wind when standing idle in the open. It is the principal object of the present invention, therefore, to provide new and improved means for raising and lowering the front end of the hay loader relative to the foretruck.

Other objects and advantageous features of our invention will become apparent to those skilled in the art after consideration of the following detailed description of the preferred embodiment thereof, reference being had to the accompanying drawings, in which Figure 1 is a side elevation of a hay loader constructed in accordance with the principles of our invention;

Figure 2 is an enlarged fragmentary view of the front end of the loader;

Figure 3 is an enlarged perspective view of the front end of the loader, showing the tongue truck in lowered position; and Figure 4 is an enlarged vertical section taken substantially along the line 4—4 in Figure 2.

Referring now to the drawings, the hay loader is indicated in its entirety by the reference numeral 5 and includes a frame 6 comprising a pair of substantially horizontally disposed bars 7 and 8 which converge forwardly and are secured at their forward ends to an angle plate 9. A pair of vertically disposed bars 10 and 11 are secured at their lower ends to the angle plate 9 and diverge laterally upwardly therefrom. The rear end of frame 6 is supported on a pair of main drive wheels 12 journaled on an axle 13 which extends transversely of the bars 7, 8 adjacent their rear ends, and the front end of the frame is supported on a tongue truck which is indicated generally by the reference numeral 14. A forwardly and upwardly inclined deck 17 is carried by the frame 6, and the hay or other material which is picked up by a raking cylinder 18, disposed at the rear end of the frame, is carried up the deck 17 by any suitable mechanism such as raking bars, or endless belt conveyor, in a manner well-known in the art.

The tongue truck or fore truck 14 comprises a transversely disposed axle 19 preferably made of angle iron bent into the shape of an inverted V and having a pair of laterally spaced supporting wheels 20 journaled on axles 21 fixed to the opposite ends thereof. The axle 19 is braced to prevent its spreading under excessive loads by a channel iron cross member 22 which is welded or otherwise rigidly fixed to the legs of the V. A forwardly extending draft member 23 is swingably connected at 24 to brackets 25 fixed to the axle, and carried at the front end of the draft member is a suitable hitch coupling device 26 for hitching the loader to the rear of a hay rack to be towed thereby.

The tongue truck 14 is connected with the hay loader frame 6 by means providing for rocking movement relative thereto about a transverse axis and for swinging movement about a fore and aft extending axis, as well as for turning movement about a vertical axis. In the preferred construction of our invention, the said connecting means consists of a normally vertically disposed bar 30 of circular cross section and provided intermediate its ends with a pair of laterally extending trunnion pivots 31 which are journaled in downturned ears 32 on a pair of laterally spaced brackets 33 which are fixed to the bottom of the angle plate 9. The ears 32 extend forwardly ahead of the front end of the angle plate 9 to allow the bar 30 to assume the vertical position without striking the vertical portion of the plate, and the lower ends of the frame members 10, 11 are spaced apart laterally to permit the bar to pass between them. As shown in Figure 1, the bar 30 is bent immediately above the pivots 31 so that the lower portion is substantially vertical, while the upper portion lies substantially in the plane of the frame members 10, 11. The bar 30 is held in the vertical position by a bolt 34 which extends forwardly through an aperture in the midpoint of a frame cross member 35 fixed to the beams 10, 11, and passes through an aligned aperture in the bar 30. A wing nut 36 is threaded onto the forwardly projecting front end of the bolt 34 and clamps the bar to the cross member.

Pivotally mounted on the bar 30 below the pivots 31 for swinging movement about the axis of the bar is a connecting member 40 preferably in the form of a casting having a pair of vertically spaced, rearwardly projecting lugs 41, 42 which are provided with vertically aligned apertures 43 to receive the bar. The upper lug 41 bears against the bottom of a shoulder or flange 44 which may be formed by welding a ring or washer to the bar 30, as shown in Figure 4.

Formed on the top of the casting 40 is an upwardly extending projection 45 having an aperture 46 therein to receive a fore and aft extending pivot bolt 47. The pivot bolt 47 also extends through an aperture 50 in the apex of the V-shaped axle 19 and is secured by a nut 51 on the front end thereof. The channel iron cross member 22 passes between the bar 30 and the casting 40 and acts as a sliding brace or guide to prevent fore and aft movement of the axle 19 relative to the connecting member 40, while permitting the axle to swing freely about the pivot 47.

The bar 30 is braced at the lower end, when in vertical position, by a bracing member 52 comprising a flat bar 53 having a U-shaped yoke 54 welded to the front end thereof. The laterally spaced, forwardly extending arms of the yoke 54 embrace the lower end of the bar 30 and are pivotally connected therewith by a pin 55. The bracing member 52 is releasably connected with the hay loader frame by latch means 56 comprising a strap or latch frame member 57 bent into the form of an elongated loop and having an angle bracket 60 welded to the lower end thereof. The bracket 60 is fixed to the midpoint of a cross bar 61 which is joined to the frame members 7, 8 and constitutes a part of the frame 6. A cross piece 62 is welded to the sides of the loop 57 intermediate the ends thereof, and the bar 53 is slidably disposed within the space between the cross piece 62 and the lower end of the loop. The end of the bar is apertured at 63 to receive a locking pin or plunger 64 which is slidably disposed within apertures 65 in the top end of the loop and cross piece 62. A spring 66 embraces the plunger 64 above the cross piece 62 and bears at one end against the top of the loop 57 and at the other end against a retaining washer 67 which is pinned to the plunger to urge the latter toward the bar 53. The top end of the plunger is bent into an eye 68 to provide a finger grip for the operator. When the tongue truck 14 is swung backwardly, as shown in Figure 3, the yoke 54 engages the forward edges of the strap or frame member 57, thereby serving as a limit to the rearward movement of the truck frame.

The operation of our invention is as follows:

During normal operation, the bar 30 is disposed in vertical position and is held therein by the bolt 34 and wing nut 36 which engage the upper end of the bar, and by the bracing member 52 which is connected to the bottom end of the bar and is locked to the frame cross piece 61 by the latch 56. In this relation, the tongue truck 14 is free to swing about the pivot bolt 47 as the wheels travel over uneven ground, or to turn about the axis of the bar 30 to steer the implement. When it is desired to lower the top of the deck 17, the operator has merely to remove the wing nut 36, pull up on the latch pin 64, and then lower the frame, using the free end of the bar 30 as a lever. The long lever arm of the bar 30 provides sufficient leverage to make the work of raising and lowering the frame relatively easy yet fast. To raise the frame, the free end of the bar 30 is swung upwardly until the spring-pressed latch pin 64 drops into the hole 63 in the bar 53 and the bolt 34 passes through its aperture in the bar. The wing nut 36 is then replaced on the bolt 34 and the machine is again ready for operation.

It will be noted in Figure 3, that after the truck has been swung rearwardly to lowered position, the implement can be steered to a limited extent by swinging the draw bar 23 and truck about the axis of the pivot bolt 47, and the truck can be tilted laterally relative to the frame about the axis of the bar 30. The functions of these two pivots are interchanged when the truck is in raised position, in which case the truck is steered by movement about the axis of bar 30 and tilted laterally about the axis of bolt 47.

What we claim as our invention and desire to secure by Letters Patent is:

1. In a hay loader of the type having a frame disposed with one end adjacent the ground for gathering up hay and the other end elevated to discharge the hay onto a vehicle, the combination of a normally vertical bar having a pivotal connection intermediate its ends with said other end of the frame for rocking movement about a transverse axis, a member mounted on said bar below said pivotal connection, a wheeled truck, a pivot bolt connecting the truck to said member for swinging movement about a fore and aft extending axis, and means for holding the upper end of said bar in fixed position with respect to the frame.

2. In a hay loader of the type having a frame disposed with one end adjacent the ground for gathering up hay and the other end elevated to discharge the hay onto a vehicle, the combination of a normally vertical bar having a pivotal connection intermediate its ends with said other end of the frame for rocking movement about a transverse axis, a wheeled truck rotatably mounted on said bar below said pivotal connection for turning movement about the axis of the bar, and means operative to hold the upper end of said bar in fixed position with respect to the frame.

3. In a hay loader of the type having a frame disposed with one end adjacent the ground for gathering up hay and the other end elevated to discharge the hay onto a vehicle, the combination of a normally vertical bar having a pivotal connection intermediate its ends with said other end of the frame for rocking movement about a transverse axis, a member journaled on the bar below said pivotal connection for turning movement about the axis of the bar, a wheeled truck pivotally connected with said member for swinging movement about a fore and aft extending axis, and means for holding the upper end of said bar in fixed position with respect to the frame.

4. A hay loader comprising a generally vertical frame portion disposed with one end adjacent the ground for gathering up hay and the other end elevated to discharge the hay onto a vehicle, a normally vertical bar having a pivotal connection intermediate its ends with the lower end of said vertical frame portion for rocking movement about a transverse axis, upwardly into a position alongside said vertical frame portion a wheeled truck mounted on the lower end of the bar, and means on the upper part of said vertical frame portion and engageable with the upper end of the bar to hold the bar in fixed vertical position.

5. In a hay loader of the type having a frame disposed with one end adjacent the ground for gathering up hay and the other end elevated to discharge the hay onto a vehicle, the combination of a bar having a pivotal connection intermediate its ends with said other end of the frame for swinging movement between vertical and horizontal positions, a wheeled truck mounted on the bar below said pivotal connection, a bracing member connected with the lower end of said bar and extending upwardly and rearwardly therefrom, and latch means on the frame engageable with the upper and rear end of said bracing member to lock the same rigidly to the frame when said bar is in vertical position, said latch means being releasable to allow said bar to be swung to horizontal position.

6. In an agricultural implement having a frame, a normally vertical bar having a pivotal connection intermediate its ends with said frame for rocking movement about a transverse axis, a member mounted on said bar below said pivotal connection, a wheeled truck, a pivot bolt connecting the truck to said member for swinging movement about a fore and aft extending axis, and means for holding the upper end of said bar in fixed position with respect to the frame.

7. In an agricultural implement having a frame, a normally vertical bar having a pivotal connection intermediate its ends with said frame for rocking movement about a transverse axis, a wheeled truck rotatably mounted on said bar below said pivotal connection for turning movement about the axis of the bar, and means operative to hold the upper end of said bar in fixed position with respect to the frame.

8. In an agricultural implement having a frame, a normally vertical bar having a pivotal connection intermediate its ends with said frame for rocking movement about a transverse axis, a member journaled on the bar below said pivotal connection for turning movement about the axis of the bar, a wheeled truck pivotally connected with said member for swinging movement about a fore and aft extending axis, and means for holding the upper end of said bar in fixed position with respect to the frame.

9. An agricultural implement comprising a frame, a normally vertically disposed member swingably connected with said frame for movement about a generally transverse axis, a wheeled truck connected with the lower end of said swingable member and swingable generally laterally relative thereto about a generally fore and aft axis, and guide means carried by said wheeled truck and said swingable member for guiding lateral swinging of said wheeled truck.

10. An agricultural implement comprising a frame, a normally vertically disposed member swingably connected with said frame for movement about a generally transverse axis between a generally vertical position and a generally horizontal position, a wheeled truck connected with the lower end of said swingable member and normally disposed in a generally vertical position when said swingable member is vertical and in a generally horizontal position when said swingable member is in a horizontal position, said wheeled truck being connected with said swingable member normally for swinging movement about vertical and fore and aft axes, and guide means on said swingable member and said wheeled truck for guiding the normal movement of the latter about said fore and aft axis, brace means between the lower end of said swingable member and said frame and serving to limit the movement of said swingable member in its horizontal position, said guide means serving to aid in the support of the frame on said wheeled truck in the horizontal position thereof.

11. An agricultural implement comprising a frame, a wheeled truck pivotally connected therewith for swinging movement about a transverse axis, a brace member connected at one end with said wheeled truck and having a shouldered part adjacent said one end, and latch mechanism on said frame adapted to engage the other end of said brace member when said wheeled truck is in a generally vertical position, said shouldered part being engageable with said latch mechanism for limiting the swinging movement of said wheeled truck in one direction.

12. An agricultural implement as defined in claim 11, further characterized by said latch mechanism including a latch frame through which said brace member is movable, the shouldered part of the latter engaging said latch frame.

13. In an implement of the class described having a frame, the combination of a truck having wheel means journaled thereon, a supporting member for said truck swingably connected thereto for movement about normally longitudinal and vertical axes, means swingably connecting said supporting member with said frame on an axis normally spaced vertically from the axis on which said wheel means is journaled providing for vertical adjustment of said frame relative to said wheels, and releasable means for securing said truck in two positions on said last mentioned axis and angularly spaced substantially 90° apart whereby said normally longitudinal and vertical axes are interchanged in the other position of said truck, together with their respective functions.

14. In a hay loader comprising a frame carried on a pair of wheels at one end thereof, a bar pivotally connected intermediate its ends with said frame near the other end of the latter, a truck mounted on the lower end of said bar, wheels journaled on said truck for rotation about an axis spaced from the pivot axis of said bar, the upper end of the latter serving as a handle to swing said truck about said pivot axis to raise and lower the frame, and means for securing said handle to said frame.

15. In a hay loader comprising a frame carried on a pair of wheels at one end thereof, a bar pivotally connected intermediate its ends with said frame near the other end of the latter for swinging movement about a transverse axis, a truck pivotally mounted on the lower end of said bar for tilting movement about a fore and aft extending axis, wheels journaled on said truck for rotation about an axis spaced from said transverse axis, the upper end of said bar serving as a handle for swinging said truck about said transverse pivot axis, and means for securing said handle to said frame.

16. In a hay loader comprising a frame carried on a pair of wheels at one end thereof, a bar pivotally connected intermediate its ends with said frame near the other end of the latter for swinging movement about a transverse axis, a truck mounted on the lower end of said bar below said pivot by means providing for lateral tilting movement about a fore and aft extending axis and for turning movement about the bar, wheels journaled on said truck for rotation about an axis normally spaced below said transverse pivot axis, the upper end of said bar normally extending upward from said pivot and serving as a handle to swing said truck to lower the frame, and means for securing said truck in raised position of said frame.

HERMAN MOSCHEL.
JAMES RUSSELL DAY.